(12) United States Patent
Liu et al.

(10) Patent No.: US 11,841,446 B2
(45) Date of Patent: Dec. 12, 2023

(54) POSITIONING METHOD AND APPARATUS (71) Applicant: BEIJING BAIDU NETCOM SCIENCE TECHNOLOGY CO., LTD., Beijing (CN)

(72) Inventors: Wenjie Liu, Beijing (CN); Renlan Cai, Beijing (CN); Xiaotao Li, Beijing (CN); Shiyu Song, Sunnyvale, CA (US)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 397 days.

(21) Appl. No.: 17/214,630

(22) Filed: Mar. 26, 2021

(65) Prior Publication Data
US 2021/0215832 A1 Jul. 15, 2021

(30) Foreign Application Priority Data
May 13, 2020 (CN) .......................... 202010401600.4

(51) Int. Cl.
*G01S 19/45* (2010.01)
*G01S 17/86* (2020.01)
*G01S 17/42* (2006.01)

(52) U.S. Cl.
CPC .............. *G01S 19/45* (2013.01); *G01S 17/42* (2013.01); *G01S 17/86* (2020.01)

(58) Field of Classification Search
CPC ......... G01S 7/4808; G01S 17/89; G01S 19/40
See application file for complete search history.

(56) References Cited

U.S. PATENT DOCUMENTS

| 11,448,771 | B2 * | 9/2022 | Cai | ......................... G01S 19/40 |
| 2009/0231582 | A1 | 9/2009 | Aebischer | |
| 2018/0299273 | A1 * | 10/2018 | Cai | ......................... G01S 17/89 |

(Continued)

FOREIGN PATENT DOCUMENTS

| CN | 106023210 A | 10/2016 |
| CN | 106052697 A | 10/2016 |

(Continued)

OTHER PUBLICATIONS

Decision to Grant Patent of the parallel application JP2021-064166.
(Continued)

*Primary Examiner* — Yuri Kan
(74) *Attorney, Agent, or Firm* — J.C. PATENTS (57) ABSTRACT

The present application discloses a positioning method and an apparatus, which relate to the technical field of intelligent driving. A specific implementation solution is: determining a first positioning result using point cloud data collected by lidar in combination with a laser point cloud reflection value map; constructing a constraint condition using the first positioning result, where the constraint condition is used to accelerate a convergence speed of solving a receiver position using observation data; performing GNSS-PPP positioning using the constraint condition in combination with observation data of a GNSS receiver to obtain a second positioning result. Using this solution, lidar positioning technology is combined with GNSS-PPP positioning technology to realize a purpose of not relying on a GNSS base station.

20 Claims, 4 Drawing Sheets

(56) References Cited

U.S. PATENT DOCUMENTS

2018/0374238 A1     12/2018     Park
2021/0239491 A1*    8/2021     Li ........................ G01S 7/4808

FOREIGN PATENT DOCUMENTS

| | | |
|---|---|---|
| CN | 106023210 B | 12/2017 |
| CN | 108196272 A | 6/2018 |
| CN | 108286979 A | 7/2018 |
| CN | 108347691 A | 7/2018 |
| CN | 108732582 A | 11/2018 |
| CN | 108732603 A | 11/2018 |
| CN | 110031881 A | 7/2019 |
| EP | 2959267 A1 | 12/2015 |
| JP | 2016080460 A | 5/2016 |
| JP | 2016188806 A | 11/2016 |
| JP | 2020008346 A | 1/2020 |

OTHER PUBLICATIONS

First Office Action of the priority application CN202010401600.4.
The extended European search report of EP21165348.
NPL1: "Improved kinematic Precise Point Positioning performance with the use of map constraints", J. Appl Geodesy 2020; 14(2); 191-204.
NPL2: "Robust Vehicle Localization in Urban Environments Using Probabilistic Maps", 2010 IEEE International Conference on Robotics and Automation Anchorage Convention District, May 3-8, 2010, Anchorage, Alaska, USA.
NPL3: "Robust and Precise Vehicle Localization based on Multi-sensor Fusion in Diverse City Scenes", 2018 IEEE International Conference on Robotics and Automation (ICRA), May 21-25, 2018, Brisbane, Australia.

* cited by examiner

POSITIONING METHOD AND APPARATUS

CROSS-REFERENCE TO RELATED APPLICATIONS

This application claims priority to Chinese Patent Application No. 202010401600.4, filed on May 13, 2020, which is hereby incorporated by reference in its entirety.

TECHNICAL FIELD

Embodiments of the present application relate to the technical field of automatic driving and, in particular, to a positioning method and an apparatus.

BACKGROUND

At present, a positioning system plays an important role in a process of automatic driving and assisted driving of an unmanned vehicle, and other modules, such as perception and path planning, perform corresponding operations based on a positioning result generated by the positioning system to varying degrees. The accuracy of positioning becomes one of key factors affecting success or failure of automatic driving or assisted driving.

The global navigation satellite system (Global Navigation Satellite System, GNSS) is a common positioning system, and positioning technologies based on GNSS mainly include real-time kinematic (Real-time kinematic, RTK) technology and precise point positioning (precise point positioning, PPP) technology. In RTK technology, differential RTK positioning is carried out between a GNSS base station and a vehicle to realize positioning with centimeter-level precision for the vehicle, by utilizing characteristics of close distance between the GNSS base station and the vehicle and relatively strong correlation of a GNSS observation error. In order to get an accurate positioning result quickly, a large number of GNSS base stations need to be deployed. In PPP technology, a satellite orbit with centimeter-level high-precision, a clock difference and a GNSS observation value at a vehicle end are used to realize positioning with centimeter-level precision for the vehicle. However, because there are many parameters to be estimated and satellite geometry changes slowly, it takes about half an hour to converge.

Obviously, how to provide a positioning method that does not rely on a GNSS base station and has fast convergence speed is regarded as an urgent problem to be solved in the industry.

SUMMARY

Embodiments of the present application provide a positioning method and an apparatus. A convergence speed of PPP positioning is accelerated by fusing lidar positioning, and a purpose of fast and accurate positioning without relying on a GNSS base station is realized.

In a first aspect, an embodiment of the present application provides a positioning method, including: determining a first positioning result using point cloud data of a vehicle at a current positioning time, where the first positioning result is used to indicate a position of the vehicle in a pre-constructed laser point cloud reflection value map at the current positioning time; constructing a constraint condition using the first positioning result, where the constraint condition is used to indicate a position relationship between a position of a vehicle-mounted GNSS receiver determined according to the first positioning result and a second positioning result, and the second positioning result is used to indicate a position of the vehicle in a rectangular coordinate system at the current positioning time; performing precise point positioning PPP using the constraint condition in combination with observation data of the vehicle-mounted GNSS receiver to obtain the second positioning result; controlling the vehicle using the second positioning result. Using this solution, lidar positioning technology is combined with GNSS-PPP positioning technology to realize a purpose of not relying on a GNSS base station. Meanwhile, using a positioning result of the lidar positioning technology, the constraint condition that can accelerate a convergence speed of solving the position of the receiver using the observation data can be constructed, thereby avoiding a drawback of the convergence speed being too slow. Therefore, the convergence speed of GNSS-PPP positioning is accelerated by fusing lidar positioning, and a purpose of fast and accurate positioning without relying on the GNSS base station is realized.

In a feasible design, the constructing the constraint condition using the first positioning result includes: determining a position of the GNSS receiver in the rectangular coordinate system according to the first positioning result; constructing the constraint condition according to the position of the GNSS receiver in the rectangular coordinate system, where the constraint condition satisfies the following equations:

$$(X_{Lidar\_fix} - X)^2 + (Y_{Lidar\_fix} - Y)^2 + (Z_{Lidar\_fix} - Z)^2 = 0$$
$$\frac{\partial X_{Lidar\_fix}}{\partial X} = 1$$
$$\frac{\partial Y_{Lidar\_fix}}{\partial Y} = 1$$
$$\frac{\partial Z_{Lidar\_fix}}{\partial Z} = 1$$

where $X_{Lidar\_fix}$ represents x-coordinate of the vehicle-mounted GNSS receiver in the rectangular coordinate system, $Y_{Lidar\_fix}$ represents y-coordinate of the vehicle-mounted GNSS receiver in the rectangular coordinate system, $Z_{Lidar\_fix}$ represents z-coordinate of the vehicle-mounted GNSS receiver in the rectangular coordinate system, X represents x-coordinate of the second positioning result to be solved, Y represents y-coordinate of the second positioning result to be solved, and Z represents z-coordinate of the second positioning result to be solved. Using this solution, the convergence speed of the GNSS-PPP positioning is accelerated by fusing the lidar positioning, and the purpose of fast and accurate positioning without relying on the GNSS base station is realized.

In a feasible design, the performing the precise point positioning PPP using the constraint condition in combination with the observation data of the vehicle-mounted GNSS receiver to obtain the second positioning result includes: constructing observation equations using the observation data; performing PPP positioning using the observation equations in combination with the constraint condition to obtain the second positioning result, where the observation equations are as follows:

$$\lambda\varphi = r + l \cdot dx + dt \cdot C + T + I + \epsilon + \lambda \cdot N$$

$$\rho = r + l \cdot dx + dt \cdot C + T - I + \epsilon$$

where ρ represents a pseudo-range between a satellite and the vehicle, N represents a carrier phase integer ambiguity, r represents a distance between the satellite and the GNSS receiver, l represents cosine of an observation direction, dt represents a correction amount of a clock difference between the satellite and the vehicle-mounted GNSS receiver, T represents a tropospheric deviation, I represents an ionospheric deviation, ε represents a noise constant, dx represents a state variable to be estimated, including a coordinate increment and a clock difference change; and C represents a speed of light in a vacuum. Using this solution, the convergence speed of the GNSS-PPP positioning is accelerated by fusing the lidar positioning, and the purpose of fast and accurate positioning without relying on the GNSS base station is realized.

In a feasible design, the determining the first positioning result using the point cloud data of the vehicle at the current positioning time includes: converting the point cloud data from a vehicle body coordinate system to a world coordinate system to obtain converted data; projecting the converted data to the laser point cloud reflection value map to obtain a projection area; determining a plurality of to-be-matched areas from the laser point cloud reflection value map according to the projection area; determining a matching probability of the projection area and each of the to-be-matched areas to obtain a plurality of matching probabilities; determining the first positioning result according to the plurality of matching probabilities. Using this solution, a purpose of determining the first positioning result using the point cloud data is realized.

In a feasible design, the determining the first positioning result according to the plurality of matching probabilities includes: determining a prediction probability of each of the plurality of matching probabilities to obtain a plurality of prediction probabilities, where each of the prediction probabilities is a matching probability corresponding to a first positioning time before the current positioning time; updating each matching probability of the plurality of matching probabilities using respective prediction probabilities corresponding to the plurality of matching probabilities to obtain a plurality of updated matching probabilities; determining a maximum matching probability from the plurality of updated matching probabilities; determining the first positioning result using a to-be-matched area corresponding to the maximum matching probability. Using this solution, accuracy of the first positioning result is improved.

In a feasible design, the updating each matching probability of the plurality of matching probabilities using respective prediction probabilities corresponding to the plurality of matching probabilities to obtain the plurality of updated matching probabilities includes: for each matching probability, determining an updated matching probability using a product of a preset normalization coefficient, the matching probability and the prediction probability corresponding to the matching probability. Using this solution, a purpose of improving the accuracy of the first positioning result is realized.

In a feasible design, before performing the precise point positioning PPP using the constraint condition in combination with the observation data of the vehicle-mounted GNSS receiver to obtain the second positioning result, the method further includes: constructing pseudo-range and carrier single difference observation equations; filtering the observation data using the pseudo-range and carrier single difference observation equations to filter out error data in the observation data. Using this solution, a purpose of improving accuracy of the second positioning result is realized by filtering out data with a larger error.

In a feasible design, before determining the first positioning result using the point cloud data of the vehicle at the current positioning time, the method further includes: dividing a ground plane of an earth surface in the world coordinate system into a plurality of map_nodes with a same size and shape; dividing each map_node of the plurality of map_nodes into a plurality of map_cells with a same size and shape; and storing corresponding map data in each map_cell of the plurality of map_cells. Using this solution, a purpose of constructing a laser reflection value map offline is realized.

In a feasible design, the map data includes at least one of the following data: a mean value of laser reflection intensity values of laser points within a positioning position corresponding to the map_cell, a variance of the laser reflection intensity values of the laser points within the positioning position corresponding to the map_cell, and a quantity of the laser points within the positioning position corresponding to the map_cell.

In a second aspect, an embodiment of the present application provides a positioning apparatus, including:
  a determining module, configured to determine a first positioning result using point cloud data of a vehicle at a current positioning time, where the first positioning result is used to indicate a position of the vehicle in a pre-constructed laser point cloud reflection value map at the current positioning time;
  a first constructing module, configured to construct a constraint condition using the first positioning result, where the constraint condition is used to indicate a position relationship between a position of a vehicle-mounted GNSS receiver determined according to the first positioning result and a second positioning result, and the second positioning result is used to indicate a position of the vehicle in a rectangular coordinate system at the current positioning time;
  a positioning module, configured to perform precise point positioning PPP using the constraint condition in combination with observation data of the vehicle-mounted GNSS receiver to obtain the second positioning result;
  a controlling module, configured to control the vehicle using the second positioning result.

In a feasible design, the first constructing module is configured to determine a position of the GNSS receiver in the rectangular coordinate system according to the first positioning result; construct the constraint condition according to the position of the GNSS receiver in the rectangular coordinate system, where the constraint condition satisfies the following equations:

$$(X_{Lidar\_fix} - X)^2 + (Y_{Lidar\_fix} - Y)^2 + (Z_{Lidar\_fix} - Z)^2 = 0$$
$$\frac{\partial X_{Lidar\_fix}}{\partial X} = 1$$
$$\frac{\partial Y_{Lidar\_fix}}{\partial Y} = 1$$
$$\frac{\partial Z_{Lidar\_fix}}{\partial Z} = 1$$

;

where $X_{Lidar\_fix}$ represents x-coordinate of the vehicle-mounted GNSS receiver in the rectangular coordinate system, $Y_{Lidar\_fix}$ represents y-coordinate of the vehicle-mounted GNSS receiver in the rectangular coordinate system, $Z_{Lidar\_fix}$ represents z-coordinate of the vehicle-mounted GNSS receiver in the rectangular coordinate system, X represents x-coordinate of the second positioning result to be solved, Y represents y-coordinate of the second positioning result to be solved, and Z represents z-coordinate of the second positioning result to be solved.

In a feasible design, the positioning module is configured to construct observation equations using the observation data; perform PPP positioning using the observation equations in combination with the constraint condition to obtain the second positioning result, where the observation equations are as follows:

$$\lambda \varphi = r + l \cdot dx + dt \cdot C + T + I + \varepsilon + \lambda \cdot N$$

$$\rho = r + l \cdot dx + dt \cdot C + T - I + \varepsilon;$$

where $\rho$ represents a pseudo-range between a satellite and the vehicle, N represents a carrier phase integer ambiguity, r represents a distance between the satellite and the GNSS receiver, l represents cosine of an observation direction, dt represents a correction amount of a clock difference between the satellite and the vehicle-mounted GNSS receiver, T represents a tropospheric deviation, I represents an ionospheric deviation, $\varepsilon$ represents a noise constant, dx represents a state variable to be estimated, including a coordinate increment and a clock difference change; and C represents a speed of light in a vacuum.

In a feasible design, the determining module is configured to convert the point cloud data from a vehicle body coordinate system to a world coordinate system to obtain converted data; project the converted data to the laser point cloud reflection value map to obtain a projection area; determine a plurality of to-be-matched areas from the laser point cloud reflection value map according to the projection area; determine a matching probability of the projection area and each of to-be-matched areas to obtain a plurality of matching probabilities; determine the first positioning result according to the plurality of matching probabilities.

In a feasible design, the determining module is configured to, when determining the first positioning result according to the plurality of matching probabilities, determine a prediction probability of each of the plurality of matching probabilities to obtain a plurality of prediction probabilities, where each of the prediction probabilities is a matching probability corresponding to a first positioning time before the current positioning time; update each matching probability of the plurality of matching probabilities using respective prediction probabilities corresponding to the plurality of matching probabilities to obtain a plurality of updated matching probabilities; determine a maximum matching probability from the plurality of updated matching probabilities; determine the first positioning result using a to-be-matched area corresponding to the maximum matching probability.

In a feasible design, the determining module is configured to, when updating each matching probability of the plurality of matching probabilities using respective prediction probabilities corresponding to the plurality of matching probabilities to obtain the plurality of updated matching probabilities, for each matching probability, determine an updated matching probability using a product of a preset normalization coefficient, the matching probability and the prediction probability corresponding to the matching probability.

In a feasible design, the above apparatus further includes: a second constructing module, configured to construct pseudo-range and carrier single difference observation equations before the positioning module performs the precise point positioning GNSS-PPP using the constraint condition in combination with the observation data of the vehicle-mounted GNSS receiver to obtain the second positioning result; filter the observation data using the pseudo-range and carrier single difference observation equations to filter out error data in the observation data.

In a feasible design, the above apparatus further includes: a third constructing module, configured to, before the determining module determines the first positioning result using the point cloud data of the vehicle at the current positioning time, divide a ground plane of an earth surface in the world coordinate system into a plurality of map_nodes with a same size and shape, divide each map_node of the plurality of map_nodes into a plurality of map_cells with a same size and shape, and store corresponding map data in each map_cell of the plurality of map_cells.

In a feasible design, the map data includes at least one of the following data: a mean value of laser reflection intensity values of laser points within a positioning position corresponding to the map_cell, a variance of the laser reflection intensity values of the laser points within the positioning position corresponding to the map_cell, and a quantity of the laser points within the positioning position corresponding to the map_cell.

In a third aspect, an embodiment of the present application provides an electronic device, including:
at least one processor; and
a memory communicatively connected to the at least one processor; where,
the memory stores instructions executable by the at least one processor, and the instructions are executed by the at least one processor to enable the at least one processor to execute the method of the first aspect or any possible implementation of the first aspect.

In a forth aspect, an embodiment of the present application provides a computer program product containing instructions, which, when running on an electronic device, causes the electronic device to execute the method according to the above first aspect or various possible implementations of the first aspect.

In a fifth aspect, an embodiment of the present application provides a non-transitory computer-readable storage medium storing computer instructions, where the instructions are stored in the non-transitory computer-readable storage medium, and when running on an electronic device, cause the electronic device to execute the method according to the above first aspect or various possible implementations of the first aspect.

In a sixth aspect, an embodiment of the present application provides a positioning method, including: obtaining point cloud data using lidar on a vehicle; determining a first positioning result using the point cloud data, where the first positioning result is used to indicate a position of the vehicle in a pre-constructed laser point cloud reflection value map at a current positioning time; constructing a constraint condition using the first positioning result so as to accelerate a convergence speed of solving a receiver position using observation data collected by a global navigation satellite system GNSS receiver on the vehicle, to obtain a second positioning result, where the second positioning result is used to indicate a position of the vehicle in a rectangular coordinate system at the current positioning time.

One of the above embodiments of the application has the following advantages or beneficial effects: the lidar positioning technology is combined with the GNSS-PPP positioning technology to realize the purpose of not relying on the GNSS base station; meanwhile, using the positioning result of the lidar positioning technology, the constraint condition that can accelerate the convergence speed of solving the position of the receiver using the observation data can be constructed, thereby avoiding the drawback of the convergence speed being too slow. Therefore, the convergence speed of the GNSS-PPP positioning is accelerated by fusing the lidar positioning, and the purpose of fast and accurate positioning without relying on the GNSS base station is realized.

Other effects of the above optional implementations will be explained in the following in combination with specific embodiments.

BRIEF DESCRIPTION OF DRAWINGS

Accompanying drawings are used to better understand the solutions, and do not constitute a limitation on the present application, among them.

DETAILED DESCRIPTION OF EMBODIMENTS

Exemplary embodiments of the present application will be described below with reference to the accompanying drawings, including various details of the present application embodiments to facilitate understanding, which should be regarded as merely exemplary. Therefore, those of ordinary skill in the art should recognize that various changes and modifications can be made to the embodiments described herein without departing from the scope and spirit of the present application. Also, for the sake of clarity and conciseness, descriptions of well-known functions and structures are omitted in the following description.

In automatic driving and unmanned driving, positioning technology is particularly important, and an accurate positioning result can ensure safety to a great extent. Common positioning technologies include GNSS positioning technology and lidar (Lidar) point cloud positioning technology, etc. The GNSS positioning technology includes GNSS-RTK positioning technology and GNSS-PPP positioning technology. Although the GNSS-RTK positioning technology can realize positioning with centimeter-level precision, in order to get an accurate positioning result quickly, a large number of GNSS base stations need to be deployed, so that GNSS base stations can be found within tens of kilometers during driving of a vehicle. The GNSS-PPP positioning technology does not need to deploy a large number of GNSS base stations, but because there are many parameters to be estimated and satellite geometry changes slowly, it takes about half an hour to converge. In the lidar point cloud positioning technology, based on Lidar point cloud data of environmental reflection, environmental features such as points, lines, surfaces, reflection values and the like are extracted, and feature matching is performed on these environmental features with a preset environmental feature database or previous and subsequent epoch environmental feature data, so as to obtain a global or relative position (pose) and realize positioning with centimeter-level precision. However, in an area with few environmental features or relatively strong time-varying characteristics of environmental features, stability and precision of a matching algorithm will be seriously degraded, and a positioning result with high precision and stability cannot be provided.

In view of this, embodiments of the present application provide a positioning method and an apparatus. A convergence speed of GNSS-PPP positioning is accelerated by fusing lidar positioning, and a purpose of fast and accurate positioning without relying on a GNSS base station is realized.

Figure 1:
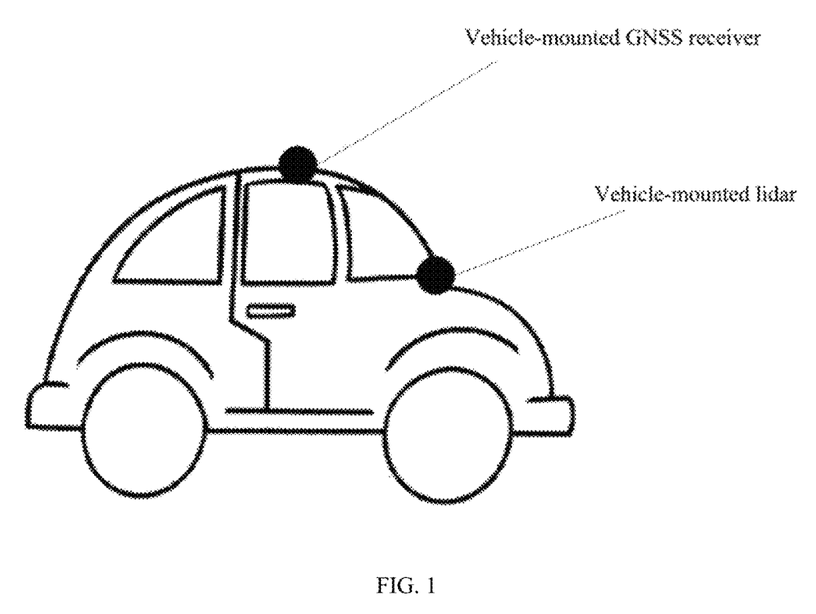
FIG. 1 is a schematic diagram of an operating environment of a positioning method provided by an embodiment of the present application.

FIG. 1 is a schematic diagram of an operating environment of a positioning method provided by an embodiment of the present application. Referring to FIG. 1, the operating environment includes a vehicle, a vehicle-mounted lidar (Lidar) disposed on the vehicle, a vehicle-mounted GNSS receiver and a satellite, etc. Although the vehicle-mounted lidar is located at the forefront of the vehicle, in actual implementation, a position of the vehicle-mounted lidar can be disposed flexibly, for example, can be disposed on the top of the vehicle.

In FIG. 1, a laser point cloud reflection value map is pre-stored in a memory of the vehicle, and the laser point cloud reflection value map may be generated by collecting environmental features and the like of the earth surface or within a certain area of the earth surface using a collection vehicle in advance. During operating of the vehicle, the vehicle-mounted GNSS receiver communicates with the satellite at each positioning time to obtain observation data, and the observation data at least contains a distance between the satellite and the vehicle-mounted GNSS receiver; and the GNSS receiver can also receive position-related information of the satellite in a rectangular coordinate system during the communication with the satellite. Meanwhile, the vehicle-mounted lidar scans surroundings of the vehicle to obtain point cloud data, and the vehicle uses the point cloud data and the laser point cloud reflection value map to determine a first positioning result, accuracy of which is not particularly high. The vehicle uses the first positioning result to construct a constraint condition, and applies the constraint condition to GNSS-PPP positioning technology, so as to accelerate a convergence speed of solving a position of the receiver using the observation data to obtain a GNSS-PPP positioning result (i.e., a second positioning result) and other parameters, such as a clock difference between the satellite and the GNSS receiver. In the process, the constraint condition is constructed using the point cloud data collected by the lidar, and the constraint condition is applied to the GNSS-PPP positioning technology, so that the convergence speed of solving the position of the receiver using the observation data is accelerated, and the purpose of fast and accurate positioning without relying on a GNSS base station is realized.

In the following, on the basis of the above FIG. 1, the positioning method described in the embodiments of the present application will be described in detail.

Figure 2:
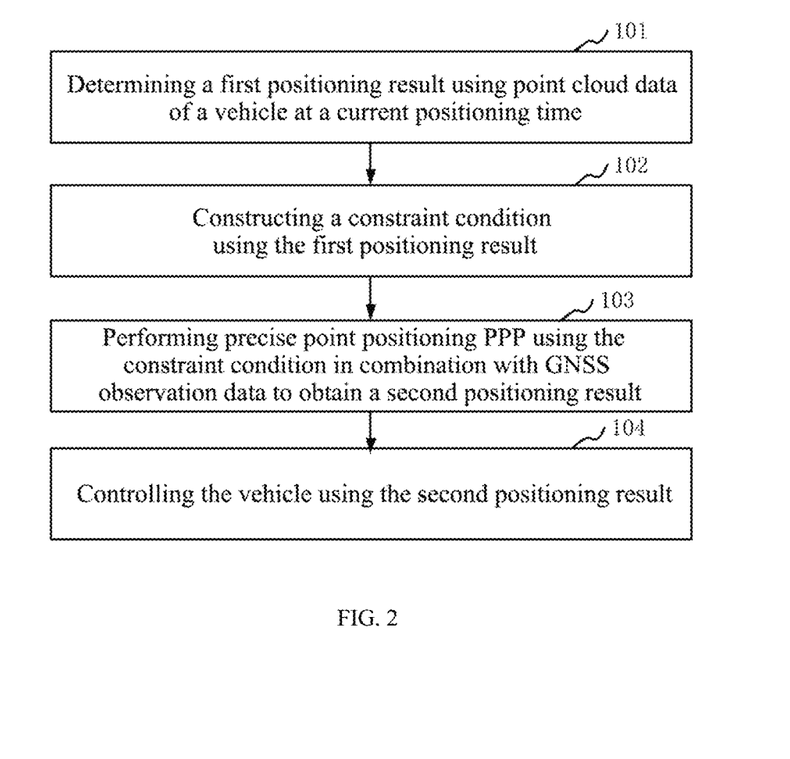
FIG. 2 is a flowchart of a positioning method provided by an embodiment of the present application.

FIG. 2 is a flowchart of a positioning method provided by an embodiment of the present application. This embodiment is explained from the respective of a positioning apparatus, and the positioning apparatus can be disposed on a vehicle, and can also be disposed on a server. When the positioning apparatus is disposed on the server, the vehicle establishes wireless network connection with the server, such as 3G connection, 4G connection, 5G connection, WiFi connection, Bluetooth connection, WiMAX connection, etc. In the following, the embodiments of the present application are explained by taking the positioning apparatus installed on the vehicle as an example, unless features are described. This embodiment includes:

101: determining a first positioning result using point cloud data of a vehicle at a current positioning time.

The first positioning result is used to indicate a position of the vehicle in a pre-constructed laser point cloud reflection value map at the current positioning time.

Exemplarily, vehicle-mounted lidar collects point cloud data and sends the same to a positioning apparatus at each positioning time, and the positioning apparatus determines a relatively accurate positioning result (hereinafter referred to as the first positioning result) using the point cloud data. This process includes two steps: in step 1, determining a rough predicted position with low accuracy using a vehicle-mounted GNSS receiver and an inertial navigation system (Inertial Navigation System, INS) on the vehicle, for example, the predicted position is a position with meter-level precision; in step 2, projecting the predicted position as the point cloud data onto a center point O of a rectangular area M on the laser reflection value map, and finding the first positioning result on the laser reflection value map using the center point O.

102: Constructing a constraint condition using the first positioning result.

The constraint condition is used to indicate a position relationship between a position of the vehicle-mounted GNSS receiver determined according to the first positioning result and a second positioning result, where the second positioning result is used to indicate a position of the vehicle in a rectangular coordinate system at the current positioning time, and a purpose of constructing the constraint condition is to accelerate a convergence speed of solving the position of the receiver using observation data.

103: Performing precise point positioning GNSS-PPP using the constraint condition in combination with the observation data to obtain the second positioning result.

The second positioning result is used to indicate the position of the vehicle in the rectangular coordinate system at the current positioning.

Exemplarily, the essence of GNSS-PPP positioning technology is to train observation equations in advance, where the observation equations include some observation variables and some parameters to be estimated, the observation variables at each positioning time are known, and the parameters to be estimated include a GNSS-PPP positioning result (hereinafter referred to as the second positioning result). Therefore, the observation equations can be solved according to the observation variables at different positioning times within a period of time, and then the parameters to be estimated can be determined, where the period of time is called convergence time. In the prior art, because there are many parameters to be estimated, the convergence time is too long, and then the convergence speed is low. Therefore, in the embodiment of the present application, the positioning apparatus constructs, according to the point cloud data collected by the vehicle-mounted lidar, the constraint condition used to accelerate the convergence speed of solving the position of the receiver using the observation data, and then quickly determines the parameters to be estimated including the second positioning result.

104: Controlling the vehicle using the second positioning result.

In the embodiment of the present application, compared with the first positioning result, accuracy of the second positioning result is higher and more accurate. Therefore, according to the second positioning result, the operating of the vehicle can be controlled more accurately and traffic safety can be improved.

According to the positioning method provided by the embodiment of the present application, the first positioning result is determined using the point cloud data collected by the lidar in combination with the laser point cloud reflection value map; the constraint condition used to accelerate the convergence speed of solving the position of the receiver using the observation data is constructed using the first positioning result; the GNSS-PPP positioning is performed using the constraint condition in combination with the observation data of the GNSS receiver to obtain the second positioning result. Using this solution, lidar positioning technology is combined with the GNSS-PPP positioning technology to realize a purpose of not relying on a GNSS base station. Meanwhile, using the positioning result of the lidar positioning technology, the constraint condition that can accelerate the convergence speed of solving the position of the receiver using the observation data can be constructed, thereby avoiding a drawback of the convergence speed being too slow. Therefore, the convergence speed of GNSS-PPP positioning is accelerated by fusing lidar positioning, and a purpose of fast and accurate positioning without relying on the GNSS base station is realized.

Figure 3:
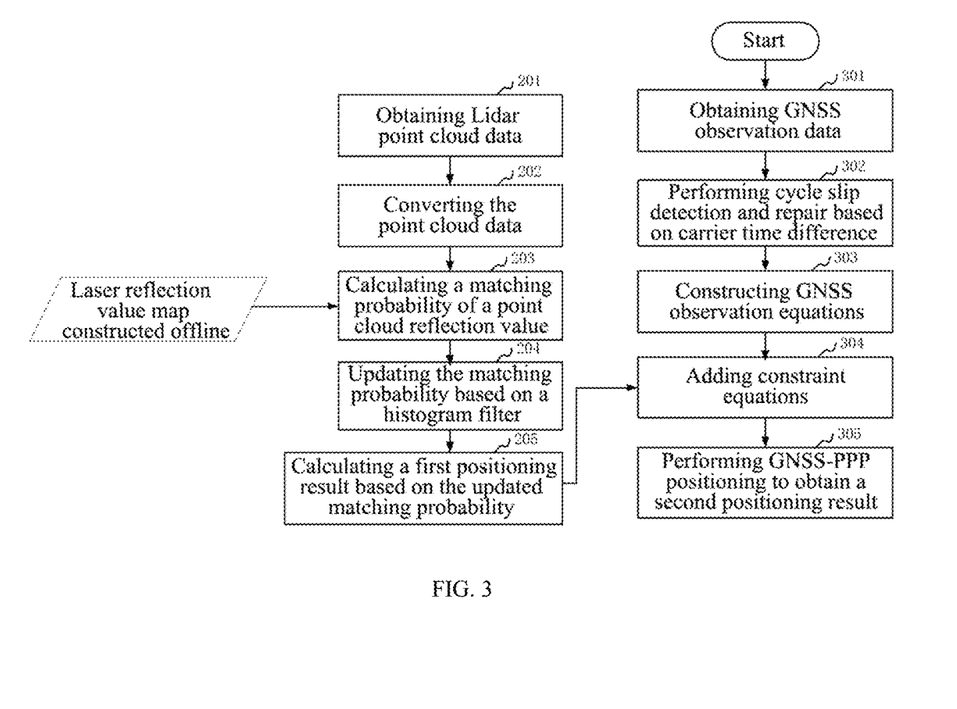
FIG. 3 is a schematic process diagram of a positioning method provided by an embodiment of the present application.

According to the above, the positioning method provided by the embodiment of the present application is mainly to combine the lidar positioning technology with the GNSS-PPP positioning technology, and the lidar positioning technology needs to use the laser reflection value map, which can be constructed offline in advance and loaded on the vehicle. It can be seen that the positioning method provided by the embodiment of the present application includes three parts: constructing the laser reflection value map, determining the first positioning result based on the lidar positioning technology, and performing the GNSS-PPP positioning based on the observation data, where the GNSS-PPP positioning based on the observation data uses the constraint condition. Exemplarily, please refer to FIG. 3, FIG. 3 is a schematic process diagram of a positioning method provided by an embodiment of the present application. Next, the three parts will be described in detail with reference to FIG. 3.

First, constructing the laser reflection value map offline.

In a feasible implementation, the construction of the laser reflection value map can be realized as follows: dividing a ground plane of an earth surface in a world coordinate system into a plurality of map_nodes with the same size and shape; dividing each map_node of the plurality of regional areas into a plurality of map_cells with the same size and shape, and storing corresponding map data in each map_cell of the plurality of map_cells. The map data includes a mean value of laser reflection intensity values of laser points within a positioning position corresponding to the map_cell, a variance of the laser reflection intensity values of the laser points within the positioning position corresponding to the map_cell, and a quantity of the laser points within the positioning position corresponding to the map_cell.

Exemplarily, this step is an offline preprocessing process. In the preprocessing process, the whole world coordinate system is divided into blocks with fixed size and shape (map_nodes), which can also be called regional areas, and each map_node covers a certain range, where the world coordinate system is, for example, the universal transverse mercator (Universal Transverse Mercator, UTM) coordinate system. In this way, when the size and arrangement rule of the map_nodes are known, a map_node where one coordinate is located can be calculated according to the coordinate, that is, the map_node where the coordinate is located. After dividing the world coordinate system into a plurality of regional areas, each map_node is divided into m×n map_cells (map_cells), for example, each map_node is divided into 1024×1024 map_cells. After that, point cloud data that fall into the same map_cell in the point cloud data collected by a collection vehicle are aggregated, and each map_cell stores the aggregated data, so that the data amount in each map_node is fixed regardless of the number of laser points. Map data corresponding to each map_cell is stored in each map_cell, and the map data includes a mean value of laser reflection intensity values of laser points within a positioning position corresponding to this map_cell, a variance of the laser reflection intensity values of the laser points within the positioning position corresponding to this map_cell, and the quantity of the laser points within the positioning position corresponding to this map_cell.

Using this solution, a purpose of constructing the laser reflection value map offline is realized.

Second, determining the first positioning result based on the Lidar positioning technology.

Please refer to FIG. 3, this part includes the following steps:

201: obtaining Lidar point cloud data.

The Lidar point cloud data is the point cloud data in the above step 101. The vehicle-mounted lidar scans the surroundings of the vehicle at each positioning time to generate the point cloud data.

202: Converting the point cloud data.

Exemplarily, the point cloud data obtained by the vehicle-mounted lidar is located in a vehicle body coordinate system, and the laser reflection value map is based on the world coordinate system. In order to match the pre-made laser reflection value map, it is necessary to process the point cloud data obtained in real time according to an organization form of laser reflection value map data, that is, to perform map_node division on the point cloud data, and further perform map_cell division on map_nodes. Therefore, at each positioning time, it is necessary to convert the point cloud data from the vehicle body coordinate system to the world coordinate system, and perform the map_node division and the map_cell division to obtain the converted data.

203: Calculating a matching probability of a point cloud reflection value.

Figure 4:
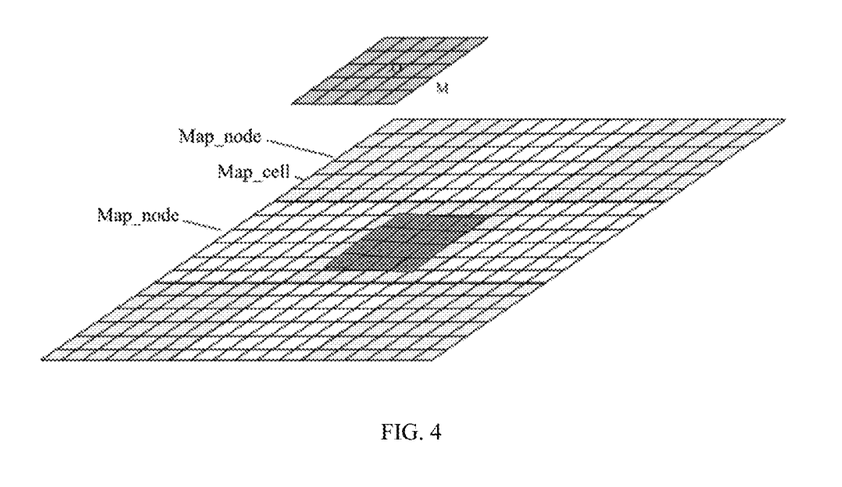
FIG. 4 is a schematic diagram of calculating a matching probability in a positioning method provided by an embodiment of the present application.

Exemplarily, please refer to FIG. 4, FIG. 4 is a schematic diagram of calculating a matching probability in a positioning method provided by an embodiment of the present application. Referring to FIG. 4, a lower cell with large area is a map_node contained in the laser reflection value map, and the upper M is a rectangular area where the point cloud data is projected on the laser reflection value map. The positioning apparatus determines a rough predicted position using an INS on the vehicle, and the predicted position is used to indicate an approximate position of the vehicle in the laser reflection value map, such as the center point O on the rectangular area M in FIG. 4. After obtaining the predicted position, a projection area corresponding to the point cloud data can be determined on the laser reflection value map. Ten, according to the projection area, a plurality of to-be-matched areas can be determined from the laser point cloud reflection value map; matching probabilities between the projection area and the to-be-matched areas can be determined to obtain a plurality of matching probabilities; and the first positioning result can be determined according to the plurality of matching probabilities.

Please refer to FIG. 4 again, the rectangular area M is an area containing 5×5 map_cells, and each map_cell records the mean value and variance of laser reflection intensity values of laser points within a positioning position corresponding to this map_cell as well as the quantity of the laser points. Because the point O is not accurate, re-estimation is needed. In the estimation process, firstly, a map_node (map_node) and a map_cell (hereinafter referred to as a first map_cell) where the center point O is located are determined from the laser reflection value map using the center point O. This map_cell and map_cells within a certain range around this map_cell (hereinafter referred to as second map_cells) are taken as map_cells that may match the first map_cell, and the second map_cells are marked with 1, 2, 3, 4, 5, 6, . . . 16 in the figure. Then, from the laser reflection value map and by taking each second map_cell as a center, a plurality of rectangular areas with the same size and shape as the rectangular area M are determined as to-be-matched areas, that is, 16 to-be-matched areas. After that, matching probabilities of the rectangular area M and the to-be-matched areas are calculated to obtain 16 matching probabilities. At last, the first positioning result is determined according to the plurality of matching probabilities.

The following formula (1) can be used to calculate a matching probability of the center point O of M and a map point (x, y):

$$P(z \mid x, y) = \alpha \frac{\sum_{i,j} |\mu_{i-x,j-y}^{m} - \mu_{i,j}^{r}| \cdot N_{i,j}^{r}}{\sum_{i,j} N_{i,j}^{r}}; \quad (1)$$

where (x, y) represents a center point of a to-be-matched area, (i, j) represents coordinates of a small cell in the to-be-matched area, z represents all measured values of a current frame, P(z|x, y) is a matching probability that the vehicle is currently in the to-be-matched area, and that is estimated according to the measured values of the current frame, In the measured values, $\mu_{i-x,j-y}^{m}$ represents a mean value of reflection values of the cell (x, y) in the to-be-matched area, $\mu_{i,j}^{r}$ represents a mean value of laser reflection intensity values within the rectangular area M; $N_{i,j}^{r}$ represents the quantity of laser points in the rectangular area M, and a is a constant. By still taking 16 to-be-matched areas as an example, because (x, y) of the 16 to-be-matched areas are different, 16 P(z|x, y), i.e. 16 matching probabilities can be obtained using the above formula (1).

In the embodiment of the present application, after calculating a plurality of matching probabilities using the formula (1), a maximum matching probability can be determined from these matching probabilities, and the first positioning result can be determined using a to-be-matched area corresponding to the maximum matching probability. Optionally, in order to further improve the accuracy, these matching probabilities can also be updated, a maximum matching probability is determined from the updated matching probabilities, and the first positioning result is determined using a to-be-matched area corresponding to the maximum matching probability. Exemplarily, please refer to step 204.

204: Updating the matching probabilities based on a histogram filter.

In the process of updating the matching probabilities, a prediction probability of each of the plurality of matching probabilities is determined to obtain a plurality of prediction probabilities. The prediction probability is a matching probability corresponding to a first positioning time before the current positioning time. Each matching probability of the plurality of matching probabilities is updated using respective prediction probabilities corresponding to the plurality of matching probabilities, to obtain a plurality of updated matching probabilities.

Exemplarily, P(z–x, y) calculated by the formula (1) in the above step 203 is the matching probability of a to-be-matched area and the rectangular area M that is estimated according to the measured values of the current frame. Meanwhile, the positioning apparatus maintains a prediction probability $\overline{P}(x, y)$, and the $\underline{P}(x, y)$ refers to a probability that the vehicle is located in the to-be-matched area and that is deduced only according to historical values without considering the measured values of the current frame. After obtaining a plurality of matching probabilities using the above step 203, the formula (2) is used to update each matching probability:

$$P(x,y) = \eta P(z|x,y) \overline{P}(x,y) \quad (2);$$

where P(x, y) represents an updated probability after updating the P(z|x, y), and η represents a normalization coefficient. Continuing with the above example, when there are 16 to-be-matched areas, 16 updated matching probabilities can be obtained using the formula (2).

205: Calculating the first positioning result based on the updated matching probabilities.

Exemplarily, the positioning apparatus determines a maximum matching probability from the plurality of updated matching probabilities, and determines the first positioning result using a to-be-matched area corresponding to the maximum matching probability. Assuming that the maximum matching probability is $P_{max}$ (x, y) among the updated matching probabilities in step 204 above, the first positioning result can be determined using formula (3). The formula (3) is as follows:

$$\overline{x} = \frac{\sum_{x,y} P_{max}(x, y)^\alpha \cdot x}{\sum_{x,y} P_{max}(x, y)^\alpha}, \overline{y} = \frac{\sum_{x,y} P_{max}(x, y)^\alpha \cdot y}{\sum_{x,y} P_{max}(x, y)^\alpha}; \quad (3)$$

where $\overline{x}$, $\overline{y}$ respectively represents abscissa and ordinate in the first positioning result, and α is a constant parameter.

Using this solution, a purpose of determining the position of the vehicle in the reflection value map of laser point cloud in real time is realized.

Finally, performing GNSS-PPP positioning based on the observation data.

Please refer to FIG. 3, this part includes the following steps:

301: obtaining observation data.

Exemplarily, the vehicle-mounted GNSS receiver on the vehicle can obtain the observation data from the satellite.

302: Performing cycle slip detection and repair based on carrier time difference.

Exemplarily, the cycle slip detection and repair can be performed for the GNSS receiver using the predicted position. In actual implementation, when using the observation data corresponding to each satellite for positioning, cycle slip detection and displacement estimation can be carried out first based on the carrier time difference. For example, pseudo-range and carrier single difference observation equations can be constructed between adjacent epochs (i.e., a previous positioning time and the current positioning time), and the two equations are as shown in formula (4):

$$\rho_{k,k-1}{}^i = r_{k,k-1}{}^i + l_{k,k-1}{}^i \cdot dx + dt_{k,k-1}{}^i \cdot C + T_{k,k-1}{}^i + I_{k,k-1}{}^i + \varepsilon$$

$$\lambda \varphi_{k,k-1}{}^i + \lambda \cdot N_{k,k-1}{}^i = r_{k,k-1}{}^i + l_{k,k-1}{}^i \cdot dx + dt_{k,k-1}{}^i \cdot C + T_{k,k-1}{}^i - I_{k,k-1}{}^i + \varepsilon \quad (4)$$

where k−1 represents the previous positioning time, k represents the current positioning time, i represents a satellite identification, $\rho_{k,k-1}{}^i$ represents a change value of a satellite-ground pseudo-range, $r_{k,k-1}{}^i$ represents a change value of a satellite-ground distance, $dt_{k,k-1}{}^i$ represents a correction amount of a clock difference between the satellite and the vehicle-mounted GNSS receiver, $T_{k,k-1}{}^i$ represents an observation distance deviation caused by a change of a tropospheric delay, $I_{k,k-1}{}^i$ represents an observation distance deviation caused by a change of an ionospheric delay, ε represents a noise constant, $\varphi_{k,k-1}{}^i$ represents a phase change observed by the GNSS receiver, $N_{k,k-1}{}^i$ represents a cycle slip value of a carrier phase, $l_{k,k-1}{}^i$ represents cosine of an observation direction, and dx represents a state variable to be estimated, including a coordinate increment and a clock difference change; and C represents a speed of light in a vacuum.

When an update frequency of the GNSS receiver is relatively large, such as 10 Hz, it can be consider that the troposphere and ionosphere have little change in one update. Let the ionosphere error and the troposphere error in the formula (4) be equal to 0, then formula (5) can be obtained:

$$\rho_{k,k-1}{}^i = r_{k,k-1}{}^i + l_{k,k-1}{}^i \cdot dx + dt_{k,k-1}{}^i \cdot C + \varepsilon$$

$$\lambda \varphi_{k,k-1}{}^i + \lambda \cdot N_{k,k-1}{}^i = r_{k,k-1}{}^i + l_{k,k-1}{}^i \cdot dx + dt_{k,k-1}{}^i \cdot C + \varepsilon \quad (5);$$

a value of $N_{k,k-1}{}^i$ can be obtained by calculating using the formula (5), and if no jump occurs, $N_{k,k-1}{}^i = 0$.

Based on the formula (5), robust estimation is used to estimate dx and $dt_{k,k-1}$, and a carrier phase observation value with cycle slip is repaired.

By taking the update frequency of the GNSS receiver being 10 Hz as an example, the GNSS receiver collects observation data every 0.1 seconds, and there may be inaccurate data in the observation data collected each time due to jump and other reasons. Therefore, it is possible to perform subtraction and error elimination on the observation data through the formula (4) and the formula (5), preprocess continuous observation data, and then construct observation equations using preprocessed observation data, that is, execute step 303.

303: Constructing GNSS observation equations.

Exemplarily, the observation equations shown in formula (6) are constructed using the preprocessed observation data obtained in the above step 302:

$$\lambda \varphi = r + l \cdot dx + dt \cdot C + T + I + \varepsilon + \lambda \cdot N$$

$$\rho = r + l \cdot dx + dt \cdot C + T - I + \varepsilon \quad (6).$$

The positioning apparatus constitutes observation equations according to the observation data of the vehicle-mounted GNSS receiver, high-precision satellite clock error and orbit, and a product of phase and code deviation correction.

In the above formulas (4), (5) and (6), on the left side of the equal sign are known observation variables, and on the right side are the parameters to be solved, where r is a distance between the positioning result (i.e. the second positioning result to be solved) obtained by GNSS-PPP and the satellite. Assuming that the second positioning result is represented as (X, Y, Z) in the rectangular coordinate system, then the distance r between the satellite identified as i and the GNSS receiver in the formula (6) can be obtained using satellite coordinates of the second positioning result. Assuming that coordinates of the satellite identified as i in the rectangular coordinate system is $(X_i, Y_i, Z_i)$, then $r=(X-X_i)^2+(Y-Y_i)^2+(Z-Z_i)^2$. It can be seen that the existing GNSS-PPP technology can obtain, according to the formula (6), the second positioning result after convergence for a period of time, but the convergence speed is slow because there are many parameters to be solved on the right side of the equal sign of the formula (6).

In order to accelerate the convergence speed, the embodiment of the present application introduces constraint equations, that is, step 304 is executed.

304: Adding constraint equations.

Exemplarily, the positioning apparatus determines a position of the GNSS receiver in the rectangular coordinate system according to the first positioning result, and constructs the constraint condition according to the position of the GNSS receiver in the rectangular coordinate system, where the constraint condition satisfies the following formula (7):

$$(X_{Lidar\_fix} - X)^2 + (Y_{Lidar\_fix} - Y)^2 + (Z_{Lidar\_fix} - Z)^2 = 0 \quad (7)$$
$$\frac{\partial X_{Lidar\_fix}}{\partial X} = 1$$
$$\frac{\partial Y_{Lidar\_fix}}{\partial Y} = 1 \quad ;$$
$$\frac{\partial Z_{Lidar\_fix}}{\partial Z} = 1$$

where $X_{Lidar\_fix}$, $Y_{Lidar\_fix}$, $Z_{Lidar\_fix}$ represent the position of the GNSS receiver in the rectangular coordinate system, and X, Y, Z represent the second positioning result.

Exemplarily, the first positioning result is obtained based on the above formula (3). The first positioning result is located in the world coordinate system, such as the UTM coordinate system, and is plane coordinates. The first positioning result can be converted into the rectangular coordinate system by combining the first positioning result with a height difference and the like, and the position ($X_{Lidar\_fix}$, $Y_{Lidar\_fix}$, $Z_{Lidar\_fix}$) of the GNSS receiver in the rectangular coordinate system can be obtained.

305: Performing GNSS-PPP positioning to obtain the second positioning result.

Exemplarily, after obtaining the constraint equations (7), under the constraint of the constraint equations (7), the positioning apparatus makes the formula (6) converge quickly using the observation data, so as to obtain the second positioning result and other parameters.

Using this solution, a purpose of constructing the constraint condition for accelerating the convergence speed of solving the position of the receiver using the observation data is realized.

Figure 5:
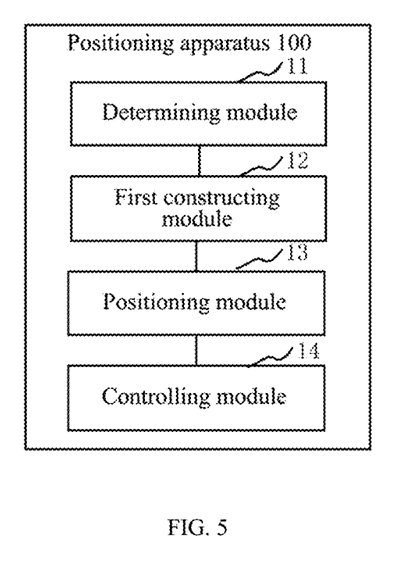
FIG. 5 is a schematic structural diagram of a positioning apparatus provided by an embodiment of the present application.

FIG. 5 is a schematic structural diagram of a positioning apparatus provided by an embodiment of the present application. The apparatus can be integrated in or realized by an electronic device, and the electronic device can be a terminal device or a server. As shown in FIG. 5, in this embodiment, the positioning apparatus 100 can include:

a determining module 11, configured to determine a first positioning result using point cloud data of a vehicle at a current positioning time, where the first positioning result is used to indicate a position of the vehicle in a pre-constructed laser point cloud reflection value map at the current positioning time;

a first constructing module 12, configured to construct a constraint condition using the first positioning result, where the constraint condition is used to indicate a position relationship between a position of a vehicle-mounted GNSS receiver determined according to the first positioning result and a second positioning result, and the second positioning result is used to indicate a position of the vehicle in a rectangular coordinate system at the current positioning time;

a positioning module 13, configured to perform precise point positioning GNSS-PPP using the constraint condition in combination with observation data of the vehicle-mounted GNSS receiver to obtain the second positioning result;

a controlling module 14, configured to control the vehicle using the second positioning result.

In a feasible design, the first constructing module 12 is configured to determine a position of the GNSS receiver in the rectangular coordinate system according to the first positioning result; construct the constraint condition according to the position of the GNSS receiver in the rectangular coordinate system, where the constraint condition satisfies the following equations:

$$(X_{Lidar\_fix} - X)^2 + (Y_{Lidar\_fix} - Y)^2 + (Z_{Lidar\_fix} - Z)^2 = 0$$
$$\frac{\partial X_{Lidar\_fix}}{\partial X} = 1$$
$$\frac{\partial Y_{Lidar\_fix}}{\partial Y} = 1 \quad ;$$
$$\frac{\partial Z_{Lidar\_fix}}{\partial Z} = 1$$

where $X_{Lidar\_fix}$ represents x-coordinate of the vehicle-mounted GNSS receiver, $Y_{Lidar\_fix}$ represents y-coordinate of the vehicle-mounted GNSS receiver, $Z_{Lidar\_fix}$ represents z-coordinate of the vehicle-mounted GNSS receiver, X represents x-coordinate of the second positioning result to be solved, Y represents y-coordinate of the second positioning result to be solved, and Z represents z-coordinate of the second positioning result to be solved.

In a feasible design, the positioning module 13 is configured to construct observation equations using the observation data; perform PPP positioning using the observation equations in combination with the constraint condition to obtain the second positioning result, where the observation equations are as follows:

$$\lambda\varphi = r + l \cdot dx + dt \cdot C + T + I + \varepsilon + \lambda \cdot N$$

$$\rho = r + l \cdot dx + dt \cdot C + T - I + \varepsilon;$$

where ρ represents a pseudo-range between a satellite and the vehicle, N represent a carrier phase integer ambiguity, r represents a distance between the satellite and the GNSS receiver, l represents cosine of an observation direction, dt represents a correction amount of a clock difference between the satellite and the vehicle-mounted GNSS receiver, T represents a tropospheric deviation, I represents an ionospheric deviation, ε represents a noise constant, dx represents a state variable to be estimated, including a coordinate increment and a clock difference change; and C represents a speed of light in a vacuum.

In a feasible design, the determining module 11 is configured to convert the point cloud data from a vehicle body coordinate system to a world coordinate system to obtain converted data; project the converted data to the laser point cloud reflection value map to obtain a projection area; determine a plurality of to-be-matched areas from the laser point cloud reflection value map according to the projection area; determine a matching probability of the projection area and each of to-be-matched areas to obtain a plurality of matching probabilities; determining the first positioning result according to the plurality of matching probabilities.

In a feasible design, the determining module 11 is configured to, when determining the first positioning result according to the plurality of matching probabilities, determine a prediction probability of each of the plurality of matching probabilities to obtain a plurality of prediction probabilities, where each of the prediction probabilities is a matching probability corresponding to a first positioning time before the current positioning time; update each matching probability of the plurality of matching probabilities using respective prediction probabilities corresponding to the plurality of matching probabilities respectively to obtain a plurality of updated matching probabilities; determine a maximum matching probability from the plurality of updated matching probabilities; determine the first positioning result using a to-be-matched area corresponding to the maximum matching probability.

In a feasible design, the determining module 11 is configured to, when updating each matching probability of the plurality of matching probabilities using respective prediction probabilities corresponding to the plurality of matching probabilities to obtain the plurality of updated matching probabilities, for each matching probability, determine an updated matching probability using a product of a preset normalization coefficient, the matching probability and the prediction probability corresponding to the matching probability.

Figure 6:
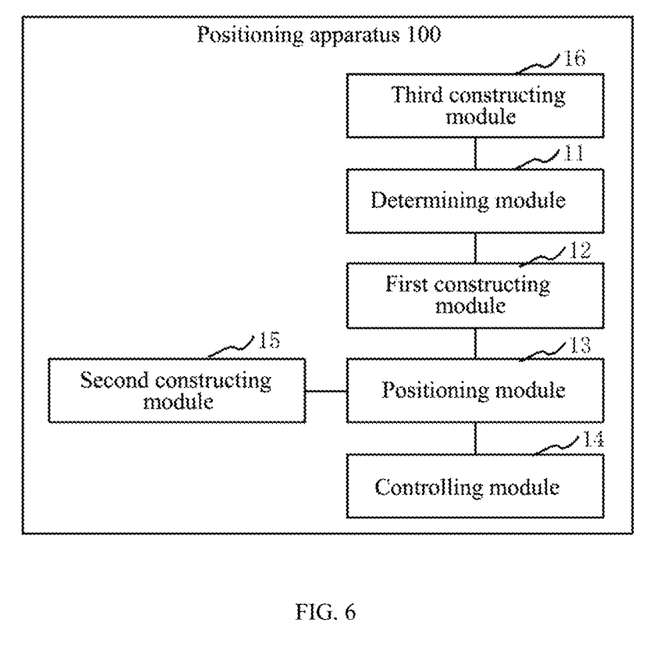
FIG. 6 is a schematic structural diagram of another positioning apparatus provided by an embodiment of the present application.

FIG. 6 is a schematic structural diagram of another positioning apparatus provided by an embodiment of the present application. Referring to FIG. 6, on the basis of the above FIG. 6, the positioning apparatus 100 provided in this embodiment further includes:

a second constructing module 15, configured to construct pseudo-range and carrier single difference observation equations before the positioning module 13 performs the precise point positioning GNSS-PPP using the constraint condition in combination with the observation data of the vehicle-mounted GNSS receiver to obtain the second positioning result; filter the observation data using the pseudo-range and carrier single difference observation equations to filter out error data in the observation data.

Please refer to FIG. 6, in a feasible design, the above positioning apparatus further includes: a third constructing module 16, configured to, before the determining module 11 determines the first positioning result using the point cloud data of the vehicle at the current positioning time, divide a ground plane of an earth surface in the world coordinate system into a plurality of map_nodes with a same size and shape; divide each map_node of the plurality of regional areas into a plurality of map_cells with a same size and shape, and store corresponding map data in each map_cell of the plurality of map_cells.

In a feasible design, the map data includes at least one of the following data: a mean value of laser reflection intensity values of laser points within a positioning position corresponding to the map_cell, a variance of the laser reflection intensity values of the laser points within the positioning position corresponding to the map_cell, and a quantity of the laser points within the positioning position corresponding to the map_cell.

The apparatus provided in the embodiment of the present application can be used for the method performed by the vehicle in the above embodiment. Implementation principles and technical effects thereof are similar, and will not be repeated here.

The present application also provides an electronic device and a readable storage medium according to embodiments of the present application.

Figure 7:
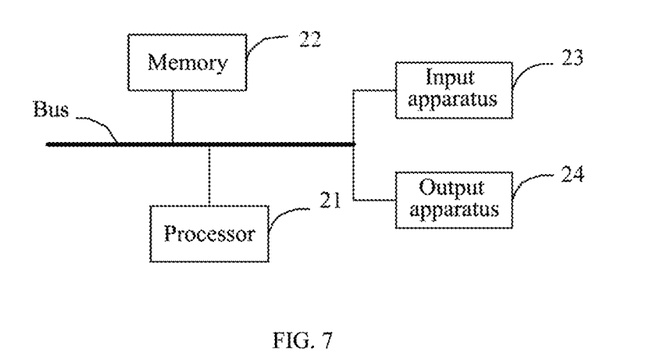
FIG. 7 is a block diagram of an electronic device for implementing a positioning method of an embodiment of the present application.

FIG. 7 is a block diagram of an electronic device for implementing a positioning method of an embodiment of the present application. As shown in FIG. 7, it is a block diagram of the electronic device for the positioning method according to the embodiment of the present application. The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile apparatuses, such as a personal digital assistant, a cellular phone, a smart phone, a wearable devices and other similar computing apparatuses. The components shown herein, their connections and relationships, and their functions are merely examples, and are not intended to limit the implementation of the present application described and/or claimed herein.

As shown in FIG. 7, the electronic device includes one or more processors 21, a memory 22, and interfaces for connecting various components, including a high-speed interface and a low-speed interface. The various components are connected to each other by different buses, and can be mounted on a common main board or in other ways as required. The processor can process instructions executed within the electronic device, including instructions stored in or on the memory to display graphical information of a GUI on an external input/output apparatus, such as a display device coupled to an interface. In other embodiments, multiple processors and/or multiple buses may be used with multiple memories, if desired. Similarly, multiple electronic devices can be connected, and each device provides some necessary operations (for example, as a server array, a group of blade servers, or a multiprocessor system). In FIG. 7, one processor 21 is taken as an example.

The memory 22 is the non-transitory computer-readable storage medium provided in the present application. The memory stores instructions executable by at least one processor, so that the at least one processor executes the positioning method provided in the present application. The non-transitory computer-readable storage medium of the present application stores computer instructions for causing a computer to execute the positioning method provided in the present application.

As a non-transitory computer readable storage medium, the memory 22 can be used to store non-transitory software programs, non-transitory computer-executable programs and modules, such as program instructions/modules corresponding to the positioning method in the embodiments of the present application (for example, the determining module 11, the first constructing module 12, the positioning module 13 and the controlling module 14 shown in FIG. 5, and the second constructing module 15 and the third constructing module 16 shown in FIG. 6). The processor 21 executes various functional applications and data processing of the server by running non-instantaneous software programs, instructions and modules stored in the memory 22, that is, realizes the positioning method in the above method embodiments.

The memory 22 may include a program storage area and a data storage area, where the program storage area may store an application program required by an operating system and at least one function; the data storage area may store data created according to the use of the positioning electronic device, etc. In addition, the memory 22 may include a high-speed random access memory, and may also include a non-transitory memory, such as at least one disk memory device, a flash memory device, or other non-transitory solid-state memory devices. In some embodiments, the memory 22 may optionally include memories disposed remotely with respect to the processor 21, and these remote memories may be connected to the positioning electronic device through a network. Examples of the above network include, but are not limited to, the Internet, an intranet, a local area network, a mobile communication network and combinations thereof.

The electronic device for the positioning method can further include an input apparatus 23 and an output apparatus 24. The processor 21, the memory 22, the input apparatus 23, and the output apparatus 24 may be connected through a bus or other ways. A connection through a bus is taken as an example in FIG. 7.

The input apparatus 23 can receive inputted digital or character information and generate key signal input related to user setting and function control of the positioning electronic device, such as a touch screen, a keypad, a mouse, a track pad, a touch pad, an indicator stick, one or more mouse buttons, a trackball, a joystick and other input apparatuses. The output apparatus 24 can include a display device, an auxiliary lighting apparatus (e.g., an LED), a tactile feedback apparatus (e.g., a vibration motor), and the like. The display device may include, but is not limited to, a liquid crystal display (LCD), a light emitting diode (LED) display, and a plasma display. In some embodiments, the display device may be a touch screen.

Various embodiments of the systems and techniques described herein may be implemented in a digital electronic circuit system, an integrated circuit systems, an application specific ASIC (application specific integrated circuit), computer hardware, firmware, software, and/or combinations thereof. These various embodiments may include being implemented in one or more computer programs that can be executed and/or interpreted on a programmable system including at least one programmable processor, which can be a special purpose or general purpose programmable processor, and can receive data and instructions from, and transmit data and instructions to, a storage system, at least one input apparatus, and at least one output apparatus.

These computing programs (also called programs, software, software applications, or codes) include machine instructions of a programmable processor, and can be implemented using high-level procedures and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein can be implemented on a computer having; a display apparatus (e.g., a CRT (Cathode Ray Tube) or LCD (Liquid Crystal Display) monitor) for displaying information to users; and a keyboard and a pointing apparatus (e.g., a mouse or a trackball) through which the user can provide inputs to the computer. Other kinds of apparatuses can also be used to provide interaction with the user. For example, a feedback provided to the user can be any form of sensory feedback (for example, visual feedback, auditory feedback, or tactile feedback); and inputs from the user can be received in any form, including acoustic input, voice input or tactile input.

The systems and techniques described herein can be implemented in a computing system including background components (e.g., as a data server), a computing system including middleware components (e.g., an application server), or a computing system including front-end components (e.g., a user computer with a graphical user interface or a web browser through which a user can interact with embodiments of the systems and techniques described herein), or a computing system including any combination of such background components, middleware components and front-end components. Components of the system can be connected to each other through digital data communication in any form or medium (e.g., a communication network). Examples of the communication network include a local area network (LAN), a wide area networks (WAN), and the Internet.

A computer system may include a client and a server. The client and the server are generally remote from each other and usually interact through a communication network. A relationship between the client and the server is generated by computer programs running on corresponding computers and having a client-server relationship with each other.

An embodiment of the present application also provides a positioning method. In the method: obtaining point cloud data using lidar on a vehicle; determining a first positioning result using the point cloud data, where the first positioning result is used to indicate a position of the vehicle in a pre-constructed laser point cloud reflection value map at the current positioning time; constructing a constraint condition using the first positioning result to accelerate a convergence speed of solving a receiver position using observation data, to obtain a second positioning result, where the second positioning result is used to indicate a position of the vehicle in a rectangular coordinate system at the current positioning.

According to the technical solutions of the embodiments of the present application, the lidar positioning technology is combined with the GNSS-PPP positioning technology to realize the purpose of not relying on the GNSS base station. Meanwhile, a construction using the positioning result of the lidar positioning technology can accelerate the convergence speed of the observation data of the GNSS receiver and avoid the drawback of the convergence speed being too slow. Therefore, the convergence speed of the GNSS-PPP positioning is accelerated by fusing the lidar positioning, and the purpose of fast and accurate positioning without relying on the GNSS base stations is realized.

It should be understood that steps may be reordered, added or deleted for the various forms of processes shown above. For example, the steps described in the present application can be performed in parallel, sequentially, or in a different order, as long as the desired results of the technical solutions disclosed in the present application can be realized. This is not limited herein.

The above specific implementations do not constitute a limitation on the protection scope of the present application. Those skilled in the art should understand that various modifications, combinations, sub-combinations and substitutions can be made according to design requirements and other factors. Any amendments, equivalent substitutions and improvements made within the spirit and principles of the present application shall be included within the protection scope of the present application.

What is claimed is:

1. A positioning method, comprising:
    determining a first positioning result using point cloud data of a vehicle at a current positioning time, wherein the first positioning result is used to indicate a position of the vehicle in a pre-constructed laser point cloud reflection value map at the current positioning time;
    constructing a constraint condition using the first positioning result, wherein the constraint condition is used to indicate a position relationship between a position of a vehicle-mounted Global Navigation Satellite System (GNSS) receiver determined according to the first positioning result and a second positioning result, and the second positioning result is used to indicate a position of the vehicle in a rectangular coordinate system at the current positioning time;
    performing precise point positioning (PPP) using the constraint condition in combination with observation data of the vehicle-mounted GNSS receiver to obtain the second positioning result;
    controlling the vehicle using the second positioning result.

2. The method according to claim 1, wherein the constructing the constraint condition using the first positioning result comprises:
    determining a position of the GNSS receiver in the rectangular coordinate system according to the first positioning result;
    constructing the constraint condition according to the position of the GNSS receiver in the rectangular coordinate system, wherein the constraint condition satisfies the following equations:

$$(X_{Lidar\_fix} - X)^2 + (Y_{Lidar\_fix} - Y)^2 + (Z_{Lidar\_fix} - Z)^2 = 0$$
$$\frac{\partial X_{Lidar\_fix}}{\partial X} = 1$$
$$\frac{\partial Y_{Lidar\_fix}}{\partial Y} = 1$$
$$\frac{\partial Z_{Lidar\_fix}}{\partial Z} = 1$$

wherein $X_{Lidar\_fix}$ represents x-coordinate of the vehicle-mounted GNSS receiver in the rectangular coordinate system, $Y_{Lidar\_fix}$ represents y-coordinate of the vehicle-mounted GNSS receiver in the rectangular coordinate system, $Z_{Lidar\_fix}$ represents z-coordinate of the vehicle-mounted GNSS receiver in the rectangular coordinate system, X represents x-coordinate of the second positioning result to be solved, Y represents y-coordinate of the second positioning result to be solved, and Z represents z-coordinate of the second positioning result to be solved.

3. The method according to claim 2, wherein the performing the precise point positioning (PPP) using the constraint condition and the observation data of the vehicle-mounted GNSS receiver to obtain the second positioning result comprises:
    constructing observation equations using the observation data;
    performing the PPP using the observation equations in combination with the constraint condition to obtain the second positioning result, wherein the observation equations are as follows:

$$\lambda\varphi = r + l \cdot dx + dt \cdot C + T + I + \varepsilon + \lambda \cdot N$$

$$\rho = r + l \cdot dx + dt \cdot C + T - I + \varepsilon;$$

wherein ρ represents a pseudo-range between a satellite and the vehicle, N represents a carrier phase integer ambiguity, r represents a distance between the satellite and the GNSS receiver, l represents cosine of an observation direction, dt represents a correction amount of a clock difference between the satellite and the vehicle-mounted GNSS receiver, T represents a tropospheric deviation, I represents an ionospheric deviation, E represents a noise constant, dx represents a state variable to be estimated, comprising a coordinate increment and a clock difference change, and C represents a speed of light in a vacuum.

4. The method according to claim 1, wherein the determining the first positioning result using the point cloud data of the vehicle at the current positioning time comprises:
    converting the point cloud data from a vehicle body coordinate system to a world coordinate system to obtain converted data;
    projecting the converted data to the laser point cloud reflection value map to obtain a projection area;
    determining a plurality of to-be-matched areas from the laser point cloud reflection value map according to the projection area;
    determining a matching probability of the projection area and each of the to-be-matched areas to obtain a plurality of matching probabilities;
    determining the first positioning result according to the plurality of matching probabilities.

5. The method according to claim 4, wherein the determining the first positioning result according to the plurality of matching probabilities comprises:
    determining a prediction probability of each of the plurality of matching probabilities to obtain a plurality of prediction probabilities, wherein each of the prediction probabilities is a matching probability corresponding to a first positioning time before the current positioning time;
    updating each matching probability of the plurality of matching probabilities using respective prediction probabilities corresponding to the plurality of matching probabilities to obtain a plurality of updated matching probabilities;
    determining a maximum matching probability from the plurality of updated matching probabilities;
    determining the first positioning result using a to-be-matched area corresponding to the maximum matching probability.

6. The method according to claim 5, wherein the updating each matching probability of the plurality of matching probabilities using respective prediction probabilities corresponding to the plurality of matching probabilities to obtain the plurality of updated matching probabilities comprises:
for each matching probability, determining an updated matching probability using a product of a preset normalization coefficient, the matching probability and the prediction probability corresponding to the matching probability.

7. The method according to claim 1, before performing the precise point positioning (PPP) using the constraint condition in combination with the observation data of the vehicle-mounted GNSS receiver to obtain the second positioning result, further comprising:
constructing pseudo-range and carrier single difference observation equations;
filtering the observation data using the pseudo-range and carrier single difference observation equations to filter out error data in the observation data.

8. The method according to claim 1, before determining the first positioning result using the point cloud data of the vehicle at the current positioning time, further comprising:
dividing a ground plane of an earth surface in a world coordinate system into a plurality of map_nodes with a same size and shape;
dividing each map_node of the plurality of map_nodes into a plurality of map_cells with a same size and shape;
storing corresponding map data in each map_cell of the plurality of map_cells.

9. The method according to claim 8, wherein the map data comprises at least one of the following data: a mean value of laser reflection intensity values of laser points within a positioning position corresponding to the map_cell, a variance of the laser reflection intensity values of the laser points within the positioning position corresponding to the map_cell, and a quantity of the laser points within the positioning position corresponding to the map_cell.

10. A positioning apparatus, comprising:
at least one processor; and
a memory communicatively connected to the at least one processor; wherein,
the memory stores instructions executable by the at least one processor, and the instructions are executed by the at least one processor to enable the at least one processor to:
determine a first positioning result using point cloud data of a vehicle at a current positioning time, wherein the first positioning result is used to indicate a position of the vehicle in a pre-constructed laser point cloud reflection value map at the current positioning time;
construct a constraint condition using the first positioning result, wherein the constraint condition is used to indicate a position relationship between a position of a vehicle-mounted Global Navigation Satellite System (GNSS) receiver determined according to the first positioning result and a second positioning result, and the second positioning result is used to indicate a position of the vehicle in a rectangular coordinate system at the current positioning time;
perform precise point positioning (PPP) using the constraint condition in combination with observation data of the vehicle-mounted GNSS receiver to obtain the second positioning result;
control the vehicle using the second positioning result.

11. The apparatus according to claim 10, wherein the at least one processor is further enabled to:
determine a position of the GNSS receiver in the rectangular coordinate system according to the first positioning result; constructing the constraint condition according to the position of the GNSS receiver in the rectangular coordinate system, wherein the constraint condition satisfies the following equations:

$$(X_{Lidar\_fix} - X)^2 + (Y_{Lidar\_fix} - Y)^2 + (Z_{Lidar\_fix} - Z)^2 = 0$$
$$\frac{\partial X_{Lidar\_fix}}{\partial X} = 1$$
$$\frac{\partial Y_{Lidar\_fix}}{\partial Y} = 1 \quad ;$$
$$\frac{\partial Z_{Lidar\_fix}}{\partial Z} = 1$$

wherein $X_{Lidar\_fix}$ represents x-coordinate of the vehicle-mounted GNSS receiver in the rectangular coordinate system, $Y_{Lidar\_fix}$ represents y-coordinate of the vehicle-mounted GNSS receiver in the rectangular coordinate system, $Z_{Lidar\_fix}$ represents z-coordinate of the vehicle-mounted GNSS receiver in the rectangular coordinate system, X represents x-coordinate of the second positioning result to be solved, Y represents y-coordinate of the second positioning result to be solved, and Z represents z-coordinate of the second positioning result to be solved.

12. The apparatus according to claim 10, wherein the at least one processor is further enabled to:
construct observation equations using the observation data; perform the PPP using the observation equations in combination with the constraint condition to obtain the second positioning result, wherein the observation equations are as follows:

$$\lambda\varphi = r + l \cdot dx + dt \cdot C + T + I + \varepsilon + \lambda \cdot N$$

$$\rho = r + l \cdot dx + dt \cdot C + T - I + \varepsilon;$$

wherein ρ represents a pseudo-range between a satellite and the vehicle, N represents a carrier phase integer ambiguity, r represents a distance between the satellite and the GNSS receiver, l represents cosine of an observation direction, dt represents a correction amount of a clock difference between the satellite and the vehicle-mounted GNSS receiver, T represents a tropospheric deviation, I represents an ionospheric deviation, E represents a noise constant, dx represents a state variable to be estimated, comprising a coordinate increment and a clock difference change, and C represents a speed of light in a vacuum.

13. The apparatus according to claim 10, wherein the at least one processor is further enabled to:
convert the point cloud data from a vehicle body coordinate system to a world coordinate system to obtain converted data; project the converted data to the laser point cloud reflection value map to obtain a projection area; determine a plurality of to-be-matched areas from the laser point cloud reflection value map according to the projection area; determine a matching probability of the projection area and each of to-be-matched areas to obtain a plurality of matching probabilities; determine the first positioning result according to the plurality of matching probabilities.

14. The apparatus according to claim 13, wherein the at least one processor is further enabled to: when determining the first positioning result according to the plurality of matching probabilities, determine a prediction probability of each of the plurality of matching probabilities to obtain a plurality of prediction probabilities, wherein each of the prediction probabilities is a matching probability corresponding to a first positioning time before the current positioning time; update each matching probability of the plurality of matching probabilities using respective prediction probabilities corresponding to the plurality of matching probabilities to obtain a plurality of updated matching probabilities; determine a maximum matching probability from the plurality of updated matching probabilities; determine the first positioning result using a to-be-matched area corresponding to the maximum matching probability.

15. The apparatus according to claim 14, wherein the at least one processor is further enabled to: when updating each matching probability of the plurality of matching probabilities using respective prediction probabilities corresponding to the plurality of matching probabilities to obtain the plurality of updated matching probabilities, for each matching probability, determine an updated matching probability using a product of a preset normalization coefficient, the matching probability and the prediction probability corresponding to the matching probability.

16. The apparatus according to claim 10, wherein the at least one processor is further enabled to:
construct pseudo-range and carrier single difference observation equations before the at least one processor performs the PPP using the constraint condition in combination with the observation data of the vehicle-mounted GNSS receiver to obtain the second positioning result; filter the observation data using the pseudo-range and carrier single difference observation equations to filter out error data in the observation data.

17. The apparatus according to claim 10, wherein the at least one processor is further enabled to: before the at least one processor determining the first positioning result using the point cloud data of the vehicle at the current positioning time, divide a ground plane of an earth surface in a world coordinate system into a plurality of map_nodes with a same size and shape, divide each map_node of the plurality of map_nodes into a plurality of map_cells with a same size and shape, and store corresponding map data in each of the plurality of map_cells.

18. The apparatus according to claim 17, wherein the map data comprises at least one of the following data: a mean value of laser reflection intensity values of laser points within a positioning position corresponding to the map_cell, a variance of the laser reflection intensity values of the laser points within the positioning position corresponding to the map_cell, and a quantity of the laser points within the positioning position corresponding to the map_cell.

19. A non-transitory computer-readable storage medium storing computer instructions, wherein the computer instructions are used for causing a computer to execute the method according to claim 1.

20. A positioning method, comprising:
obtaining point cloud data using lidar on a vehicle;
determining a first positioning result using the point cloud data, wherein the first positioning result is used to indicate a position of the vehicle in a pre-constructed laser point cloud reflection value map at a current positioning time;
constructing a constraint condition using the first positioning result so as to accelerate a convergence speed of solving a receiver position using observation data collected by a global navigation satellite system Global Navigation Satellite System (GNSS) receiver on the vehicle, to obtain a second positioning result, wherein the second positioning result is used to indicate a position of the vehicle in a rectangular coordinate system at the current positioning time;
controlling the vehicle using the second positioning result.

* * * * *